(12) United States Patent
Marzano et al.

(10) Patent No.: US 11,811,331 B2
(45) Date of Patent: Nov. 7, 2023

(54) INSULATED-GATE BIPOLAR TRANSISTOR (IGBT) RECTIFIER FOR CHARGING ULTRA-CAPACITORS

(71) Applicant: Velocity Magnetics, Inc., New Castle, PA (US)

(72) Inventors: Domenic P. Marzano, New Castle, PA (US); Alex R. Rugh, New Castle, PA (US); Joseph L. Hake, New Castle, PA (US)

(73) Assignee: Velocity Magnetics, Inc., New Castle, PA (US)

( * ) Notice: Subject to any disclaimer, the term of this patent is extended or adjusted under 35 U.S.C. 154(b) by 0 days.

(21) Appl. No.: 17/918,806

(22) PCT Filed: Nov. 1, 2021

(86) PCT No.: PCT/US2021/057571
§ 371 (c)(1),
(2) Date: Oct. 13, 2022

(87) PCT Pub. No.: WO2022/094402
PCT Pub. Date: May 5, 2022

(65) Prior Publication Data
US 2023/0121050 A1  Apr. 20, 2023

Related U.S. Application Data

(60) Provisional application No. 63/108,089, filed on Oct. 30, 2020.

(51) Int. Cl.
*H02M 7/217* (2006.01)
*H02M 1/00* (2006.01)
*H02M 7/06* (2006.01)

(52) U.S. Cl.
CPC ....... *H02M 7/2176* (2013.01); *H02M 1/0009* (2021.05); *H02J 2207/20* (2020.01); *H02J 2207/50* (2020.01); *H02M 7/06* (2013.01)

(58) Field of Classification Search
CPC .............. H02J 2207/20; H02J 2207/30; H02J 2207/40; H02J 2207/50; H02J 2207/022;
(Continued)

(56) References Cited

U.S. PATENT DOCUMENTS

| | | | | |
|---|---|---|---|---|
| 6,118,676 A | * | 9/2000 | Divan | H02M 5/458 363/34 |
| 2002/0089307 A1 | * | 7/2002 | Yang | G06F 1/263 320/116 |

(Continued)

FOREIGN PATENT DOCUMENTS

WO   2012025660 A1   3/2012

*Primary Examiner* — Gustavo A Rosario-Benitez
(74) *Attorney, Agent, or Firm* — The Webb Law Firm (57) ABSTRACT

Provided is a system for an insulated-gate bipolar transistor (IGBT) rectifier for charging ultra-capacitors. The system may include a power converter, which may receive power from a power source. A direct current (DC) bus may be connected to the power converter and may receive power from the power converter. At least one IGBT may be connected to the DC bus and may receive power from the DC bus. An array of ultra-capacitors may be connected to the at least one IGBT. At least one controller may control the at least one IGBT to charge the array of ultra-capacitors. A method and computer program product are also disclosed.

16 Claims, 6 Drawing Sheets

(58) Field of Classification Search
CPC .... H02M 1/42; H02M 1/4216; H02M 1/4266; H02M 1/4291; H02M 1/0009; H02M 1/36; H02M 1/12; H02M 7/217; H02M 7/2176; H02M 7/06
See application file for complete search history.

(56) References Cited

U.S. PATENT DOCUMENTS

| | | | |
|---|---|---|---|
| 2011/0050173 A1* | 3/2011 | King | H02J 1/10 320/128 |
| 2011/0227422 A1* | 9/2011 | Kumar | H02J 3/1842 307/109 |
| 2012/0112693 A1* | 5/2012 | Kusch | B60L 53/22 320/109 |
| 2012/0245772 A1* | 9/2012 | King | B60W 10/30 180/65.265 |
| 2013/0119902 A1* | 5/2013 | Gries | H02M 5/4585 318/400.3 |
| 2013/0201732 A1 | 8/2013 | Barauna | |
| 2013/0234675 A1* | 9/2013 | King | H02J 7/02 320/163 |
| 2015/0091478 A1* | 4/2015 | Marzano | A63G 7/00 318/135 |
| 2017/0149366 A1 | 5/2017 | Gibbs et al. | |
| 2018/0254732 A1* | 9/2018 | Smolenaers | H02P 27/08 |
| 2020/0169088 A1* | 5/2020 | Myers | H02J 7/34 |
| 2020/0207219 A1* | 7/2020 | Slepchenkov | B60L 50/64 |
| 2021/0083487 A1* | 3/2021 | Monden | H02J 3/32 |

\* cited by examiner

INSULATED-GATE BIPOLAR TRANSISTOR (IGBT) RECTIFIER FOR CHARGING ULTRA-CAPACITORS

CROSS REFERENCE TO RELATED APPLICATIONS

This application is the United States national phase of International Application No. PCT/US2021/057571 filed Nov. 1, 2021, and claims priority to U.S. Provisional Patent Application No. 63/108,089 filed Oct. 30, 2020, the disclosures of which are hereby incorporated by reference in their entirety.

BACKGROUND

1. Field

This disclosed subject matter relates generally to methods, systems, and products for insulated-gate bipolar transistor (IGBT) rectifiers and, in some particular embodiments, to a method, system, and computer program product for an IGBT rectifier for charging ultra-capacitors.

2. Technical Considerations

In certain applications, rectifiers may be used to convert alternating current (AC) to direct current (DC). Exemplary rectifiers include diode bridge rectifiers, fully controlled Thyristor rectifiers, and half controlled rectifiers that utilize both Thyristors and diodes. However, such rectifiers are high in current harmonics, and therefore such rectifiers increase the total harmonic distortion (THD) (e.g., THD back to the power supply, such as a utility line) unless a sine wave filter is utilized (e.g., in line prior to the rectifier). Sine wave filters are complex and expensive. Additionally, such rectifiers have high acoustic noise levels, and, depending on the phase angle of the firing circuit, such rectifiers may have a low power factor.

Insulated-Gate Bipolar Transistors (IGBTs) are not currently used as rectifiers for charging capacitors because IGBTs are normally in an open circuit state when such IGBTs are not being gated, but, upon application of a gating signal to the gate of an IGBT, the IGBT immediately starts conducting current, thereby allowing current to rise infinitely (e.g., within nanoseconds) when attempting to charge a capacitor that has zero charge (e.g., because a capacitor at zero charge is basically a short circuit condition, as there is little to no voltage across the capacitor). For example, the short circuit condition of the capacitor can cause the IGBT to immediately overheat and fail.

Certain capacitor charging systems use pre-charge resistors to limit the current when charging capacitors, but for large capacitor banks (e.g., an array of ultra-capacitors) such resistors would be impractical (e.g., need to be very large and very expensive) and/or would waste energy.

SUMMARY

Accordingly, it is an object of the presently disclosed subject matter to provide methods, systems, and computer program products for an insulated-gate bipolar transistor (IGBT) rectifier for charging ultra-capacitors that overcome some or all of the deficiencies identified above.

According to non-limiting embodiments, provided is a system for an IGBT rectifier for charging ultra-capacitors. In some non-limiting embodiments, the system for an IGBT rectifier for charging ultra-capacitors may include a power converter configured to receive power from a power source. A direct current (DC) bus may be connected to the power converter and configured to receive power from the power converter. At least one IGBT may be connected to the DC bus and configured to receive power from the DC bus. An array of ultra-capacitors may be connected to the at least one IGBT. At least one controller may be configured to control the at least one IGBT to charge the array of ultra-capacitors.

In some non-limiting embodiments, at least one switch may be connected to the power source. Additionally or alternatively, at least one circuit breaking element may be connected to the at least one switch and the power converter. In some non-limiting embodiments, the at least one switch may be configured to receive power from the power source and to supply power to the power converter via the at least one circuit breaking element.

In some non-limiting embodiments, the power source may include an AC power supply. Additionally or alternatively, the power converter may be configured to convert AC power from the AC power supply to DC power to be supplied to the DC bus.

In some non-limiting embodiments, the power source may include a multi-phase AC power supply. In some non-limiting embodiments, the power converter may include a diode bridge rectifier. For example, the diode bridge rectifier may include at least one diode for each phase of the multi-phase AC power supply.

In some non-limiting embodiments, the multi-phase AC power supply may include a three-phase AC power supply, which may include a first power line, a second power line, and a third power line. In some non-limiting embodiments, the diode bridge rectifier may include a first diode connected on a first side of the first power line, a second diode on a second side of the first power line, a third diode connected on a first side of the second power line, a fourth diode on a second side of the second power line, a fifth diode connected on a first side of the third power line, and a sixth diode on a second side of the third power line.

In some non-limiting embodiments, a pre-charge circuit may include a contactor in parallel with a resistor. Additionally or alternatively, the pre-charge circuit may be connected between the power converter and the DC bus.

In some non-limiting embodiments, a capacitor set may include a plurality of capacitors connected to the DC bus. The capacitor set may be configured to maintain a voltage level of the DC bus.

In some non-limiting embodiments, the at least one IGBT may include a first IGBT set and a second IGBT set. In some non-limiting embodiments, the first IGBT set may include at least one first IGBT. Additionally or alternatively, the second IGBT set may include at least one second IGBT.

In some non-limiting embodiments, the first IGBT set may be connected to a discharge resistor, and the discharge resistor may be connected to a first current sensor. Additionally or alternatively, the second IGBT set may be connected to a reactor, and the reactor may be connected to a second current sensor. In some non-limiting embodiments, the first current sensor and the second current sensor may be connected to the at least one controller.

In some non-limiting embodiments, the at least one controller may be configured to control the first IGBT set based on current sensed by the first current sensor. Additionally or alternatively, the at least one controller may be configured to control the second IGBT set based on current sensed by the second current sensor.

In some non-limiting embodiments, the at least one controller may be configured to control the first IGBT set based on current sensed by the first current sensor to control an amount of current supplied to the discharge resistor over time.

In some non-limiting embodiments, the at least one controller may be configured to control the second IGBT set based on current sensed by the second current sensor to control an amount of current supplied to the array of ultra-capacitors over time.

In some non-limiting embodiments, the at least one second IGBT may include a first-second IGBT and a second-second IGBT. In some non-limiting embodiments, the DC bus may be connected to a collector of the first-second IGBT, and the reactor may be connected to an emitter of the first-second IGBT. Additionally or alternatively, the array of ultra-capacitors may be connected to the second current sensor opposite the reactor.

In some non-limiting embodiments, the at least one first IGBT may include a first-first IGBT and a second-first IGBT. In some non-limiting embodiments, the first current sensor may be connected between the emitter of the first-second IGBT and the reactor. Additionally or alternatively, a collector of the second-first IGBT may be connected to the discharge resistor opposite the first current sensor, and an emitter of the second-first IGBT may be connected to ground.

According to non-limiting embodiments, provided is a method for an IGBT rectifier for charging ultra-capacitors. In some non-limiting embodiments, a method for an IGBT rectifier for charging ultra-capacitors may include receiving power at a power converter from a power source, supplying power from the power converter to a direct current (DC) bus, supplying power from the DC bus to at least one insulated-gate bipolar transistor (IGBT), and controlling the at least one IGBT to charge an array of ultra-capacitors.

In some non-limiting embodiments, the power converter may convert power from AC to DC before supplying power from the power converter to the DC bus.

In some non-limiting embodiments, the at least one IGBT may include a first IGBT set and a second IGBT set. The first IGBT set may be connected to a discharge resistor, and the discharge resistor may be connected to a first current sensor. The second IGBT set may be connected to a reactor, and the reactor may be connected to a second current sensor. In some non-limiting embodiments, controlling the at least one IGBT may include controlling the first IGBT set based on current sensed by the first current sensor and controlling the second IGBT set based on current sensed by the second current sensor.

In some non-limiting embodiments, controlling the first IGBT set may include controlling the first IGBT set based on current sensed by the first current sensor to control a first amount of current supplied to the discharge resistor over time. Additionally or alternatively, controlling the second IGBT set may include controlling the second IGBT set based on current sensed by the second current sensor to control a second amount of current supplied to the array of ultra-capacitors over time.

According to non-limiting embodiments, provided is a computer program product for an IGBT rectifier for charging ultra-capacitors. The computer program product may include at least one non-transitory computer-readable medium including one or more instructions that, when executed by at least one processor, cause the at least one processor to control at least one insulated-gate bipolar transistor (IGBT) to receive power from a power source via a power converter and a direct current (DC) bus and to charge an array of ultra-capacitors.

In some non-limiting embodiments, the at least one IGBT may include a first IGBT set and a second IGBT set. The first IGBT set may be connected to a discharge resistor, and the discharge resistor may be connected to a first current sensor. The second IGBT set may be connected to a reactor, and the reactor may be connected to a second current sensor. In some non-limiting embodiments, controlling the at least one IGBT may include controlling the first IGBT set based on current sensed by the first current sensor to control a first amount of current supplied to the discharge resistor over time and/or controlling the second IGBT set based on current sensed by the second current sensor to control a second amount of current supplied to the array of ultra-capacitors over time.

Further non-limiting embodiments are set forth in the following numbered clauses:

Clause 1: A system, comprising: a power converter configured to receive power from a power source; a direct current (DC) bus connected to the power converter and configured to receive power from the power converter; at least one insulated-gate bipolar transistor (IGBT) connected to the DC bus and configured to receive power from the DC bus; an array of ultra-capacitors connected to the at least one IGBT; and at least one controller configured to control the at least one IGBT to charge the array of ultra-capacitors.

Clause 2: The system of clause 1, further comprising: at least one switch connected to the power source; and at least one circuit breaking element connected to the at least one switch and the power converter, wherein the at least one switch is configured to receive power from the power source and to supply power to the power converter via the at least one circuit breaking element.

Clause 3: The system of any preceding clause, wherein the power source comprises an AC power supply, and wherein the power converter is configured to convert AC power from the AC power supply to DC power to be supplied to the DC bus.

Clause 4: The system of any preceding clause, wherein the power source comprises a multi-phase AC power supply, wherein the power converter comprises a diode bridge rectifier, and wherein the diode bridge rectifier comprises at least one diode for each phase of the multi-phase AC power supply.

Clause 5: The system of any preceding clause, wherein the multi-phase AC power supply comprises a three-phase AC power supply comprising a first power line, a second power line, and a third power line, and wherein the diode bridge rectifier comprises a first diode connected on a first side of the first power line, a second diode on a second side of the first power line, a third diode connected on a first side of the second power line, a fourth diode on a second side of the second power line, a fifth diode connected on a first side of the third power line, and a sixth diode on a second side of the third power line.

Clause 6: The system of any preceding clause, further comprising a pre-charge circuit comprising a contactor in parallel with a resistor, wherein the pre-charge circuit is connected between the power converter and the DC bus.

Clause 7: The system of any preceding clause, further comprising a capacitor set comprising a plurality of capacitors connected to the DC bus, wherein the capacitor set is configured to maintain a voltage level of the DC bus.

Clause 8: The system of any preceding clause, wherein the at least one IGBT comprises a first IGBT set and a second IGBT set, the first IGBT set comprising at least one first IGBT and the second IGBT set comprising at least one second IGBT.

Clause 9: The system of any preceding clause, wherein the first IGBT set is connected to a discharge resistor and the discharge resistor is connected to a first current sensor, wherein the second IGBT set is connected to a reactor and the reactor is connected to a second current sensor, and wherein the first current sensor and the second current sensor are connected to the at least one controller.

Clause 10: The system of any preceding clause, wherein the at least one controller is configured to control the first IGBT set based on current sensed by the first current sensor, and wherein the at least one controller is configured to control the second IGBT set based on current sensed by the second current sensor.

Clause 11: The system of any preceding clause, wherein the at least one controller is configured to control the first IGBT set based on current sensed by the first current sensor to control an amount of current supplied to the discharge resistor over time.

Clause 12: The system of any preceding clause, wherein the at least one controller is configured to control the second IGBT set based on current sensed by the second current sensor to control an amount of current supplied to the array of ultra-capacitors over time.

Clause 13: The system of any preceding clause, wherein the at least one second IGBT comprises a first-second IGBT and a second-second IGBT, wherein the DC bus is connected to a collector of the first-second IGBT and wherein the reactor is connected to an emitter of the first-second IGBT, and wherein the array of ultra-capacitors is connected to the second current sensor opposite the reactor.

Clause 14: The system of any preceding clause, wherein the at least one first IGBT comprises a first-first IGBT and a second-first IGBT, wherein the first current sensor is connected between the emitter of the first-second IGBT and the reactor, and wherein a collector of the second-first IGBT is connected to the discharge resistor opposite the first current sensor and an emitter of the second-first IGBT is connected to ground.

Clause 15: A method, comprising: receiving power at a power converter from a power source; supplying power from the power converter to a direct current (DC) bus; supplying power from the DC bus to at least one insulated-gate bipolar transistor (IGBT); and controlling the at least one IGBT to charge an array of ultra-capacitors.

Clause 16: The method of clause 15, further comprising converting, by the power converter, power from alternating current (AC) to DC before supplying power from the power converter to the DC bus.

Clause 17: The method of one of clauses 15 or 16, wherein the at least one IGBT comprises a first IGBT set and a second IGBT set, wherein the first IGBT set is connected to a discharge resistor and the discharge resistor is connected to a first current sensor, wherein the second IGBT set is connected to a reactor and the reactor is connected to a second current sensor, and wherein controlling the at least one IGBT comprises controlling the first IGBT set based on current sensed by the first current sensor and controlling the second IGBT set based on current sensed by the second current sensor.

Clause 18: The method of any one of clauses 15-17, wherein controlling the first IGBT set comprises controlling the first IGBT set based on current sensed by the first current sensor to control a first amount of current supplied to the discharge resistor over time, and wherein controlling the second IGBT set comprises controlling the second IGBT set based on current sensed by the second current sensor to control a second amount of current supplied to the array of ultra-capacitors over time.

Clause 19: A computer program product comprising at least one non-transitory computer-readable medium including one or more instructions that, when executed by at least one processor, cause the at least one processor to: control at least one insulated-gate bipolar transistor (IGBT) to receive power from a power source via a power converter and a direct current (DC) bus and to charge an array of ultra-capacitors.

Clause 20: The computer program product of clause 19, wherein the at least one IGBT comprises a first IGBT set and a second IGBT set, wherein the first IGBT set is connected to a discharge resistor and the discharge resistor is connected to a first current sensor, wherein the second IGBT set is connected to a reactor and the reactor is connected to a second current sensor, and wherein controlling the at least one IGBT comprises: controlling the first IGBT set based on current sensed by the first current sensor to control a first amount of current supplied to the discharge resistor over time, and controlling the second IGBT set based on current sensed by the second current sensor to control a second amount of current supplied to the array of ultra-capacitors over time.

These and other features and characteristics of the presently disclosed subject matter, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosed subject matter. As used in the specification and the claims, the singular form of "a," "an," and "the" include plural referents unless the context clearly dictates otherwise.

BRIEF DESCRIPTION OF THE DRAWINGS

Additional advantages and details of the disclosed subject matter are explained in greater detail below with reference to the exemplary embodiments that are illustrated in the accompanying figures, in which.

DESCRIPTION

For purposes of the description hereinafter, the terms "end," "upper," "lower," "right," "left," "vertical," "horizontal," "top," "bottom," "lateral," "longitudinal," and derivatives thereof shall relate to the disclosed subject matter as it is oriented in the drawing figures. However, it is to be understood that the disclosed subject matter may assume various alternative variations and step sequences, except where expressly specified to the contrary. It is also to be understood that the specific devices and processes illustrated in the attached drawings, and described in the following specification, are simply exemplary embodiments or aspects of the disclosed subject matter. Hence, specific dimensions and other physical characteristics related to the embodiments or aspects disclosed herein are not to be considered as limiting unless otherwise indicated.

No aspect, component, element, structure, act, step, function, instruction, and/or the like used herein should be construed as critical or essential unless explicitly described as such. Also, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, and/or the like) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or transmit information to the other unit. This may refer to a direct or indirect connection (e.g., a direct communication connection, an indirect communication connection, and/or the like) that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and communicates the processed information to the second unit. In some non-limiting embodiments, a message may refer to a network packet (e.g., a data packet and/or the like) that includes data. It will be appreciated that numerous other arrangements are possible.

As used herein, the term "controller" may refer to one or more computing devices or combinations of computing devices (e.g., processors, servers, devices, software applications, components of such, and/or the like). Reference to "a controller," "a processor," and/or the like, as used herein, may refer to a previously-recited controller or processor that is recited as performing a previous step or function, a different controller or processor, and/or a combination of controllers and/or processors. For example, as used in the specification and the claims, a first controller or a first processor that is recited as performing a first step or a first function may refer to the same or different controller or the same or different processor recited as performing a second step or a second function.

Non-limiting embodiments of the disclosed subject matter are directed to systems, methods, and computer program products for an insulated-gate bipolar transistor (IGBT) rectifier for charging ultra-capacitors. For example, non-limiting embodiments of the disclosed subject matter provide a new type of rectifier for use in the application of charging capacitors (e.g., an array of ultra-capacitors). Additionally or alternatively, non-limiting embodiments of the disclosed subject matter provide reduced parasitic primary inductance using a laminated coplanar direct current (DC) bus assembly. Additionally or alternatively, non-limiting embodiments of the disclosed subject matter prevents DC overvoltage and overcurrent during the initial charging phase of the capacitors (e.g., array of ultra-capacitors) using a current pulse limiting inductor. Additionally or alternatively, non-limiting embodiments of the disclosed subject matter allow for reduced harmonics on the supply side (e.g., the power source), improved power factor, reduced acoustic noise levels, and better immunity to power distortions (e.g., utility supply waveform distortions), e.g., compared to other types of rectifiers (e.g., thyristors, diodes, and/or the like).

For the purpose of illustration, in the following description, while the presently disclosed subject matter is described with respect to methods, systems, and computer program products for an IGBT rectifier, e.g., for charging ultra-capacitors, one skilled in the art will recognize that the disclosed subject matter is not limited to the illustrative embodiments. For example, the methods, systems, and computer program products described herein may be used with a wide variety of settings, such as rectifiers in any setting suitable for using such rectifiers, e.g., converting alternating current (AC) power to DC power and/or the like.

Figure 1A:
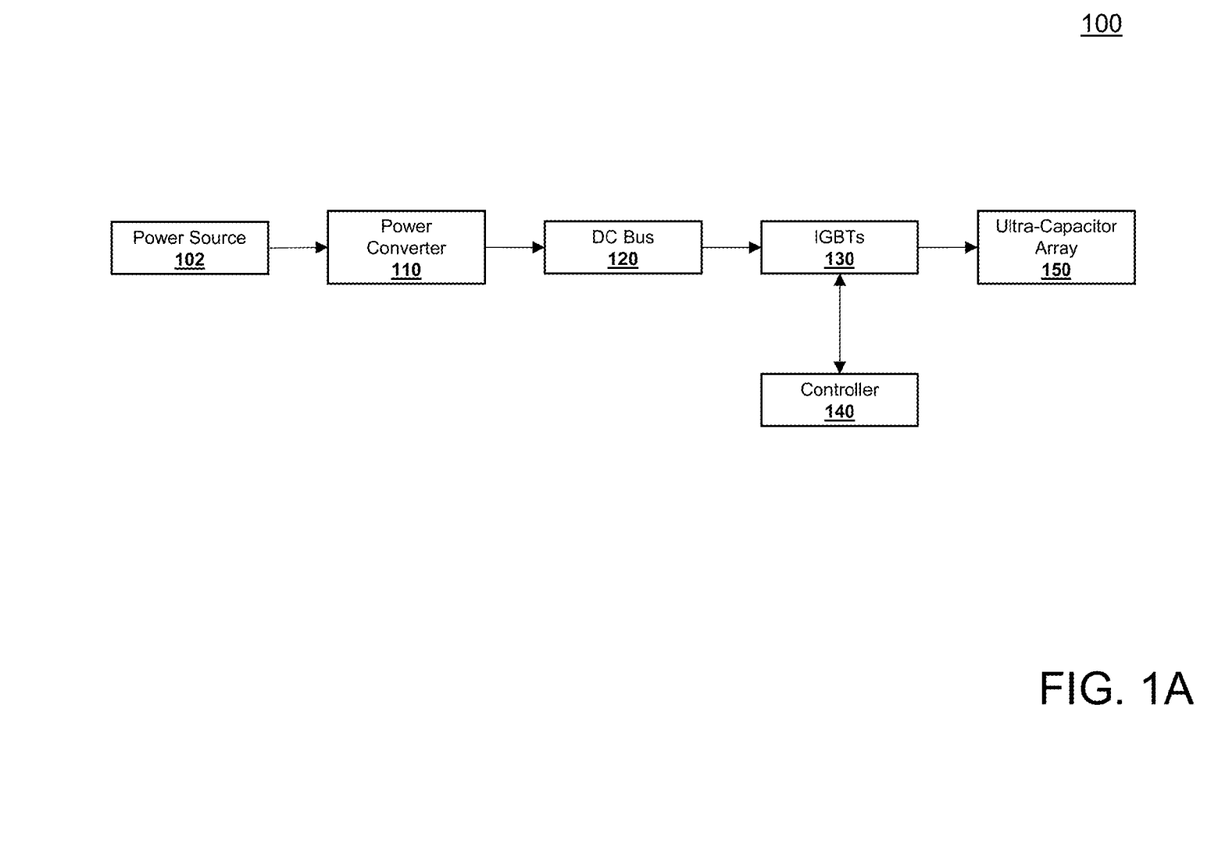
FIGS. 1A-1B are diagrams of an exemplary environment in which methods, systems, and/or computer program products, described herein, may be implemented according to non-limiting embodiments of the principles of the presently disclosed subject matter.
Figure 1B:
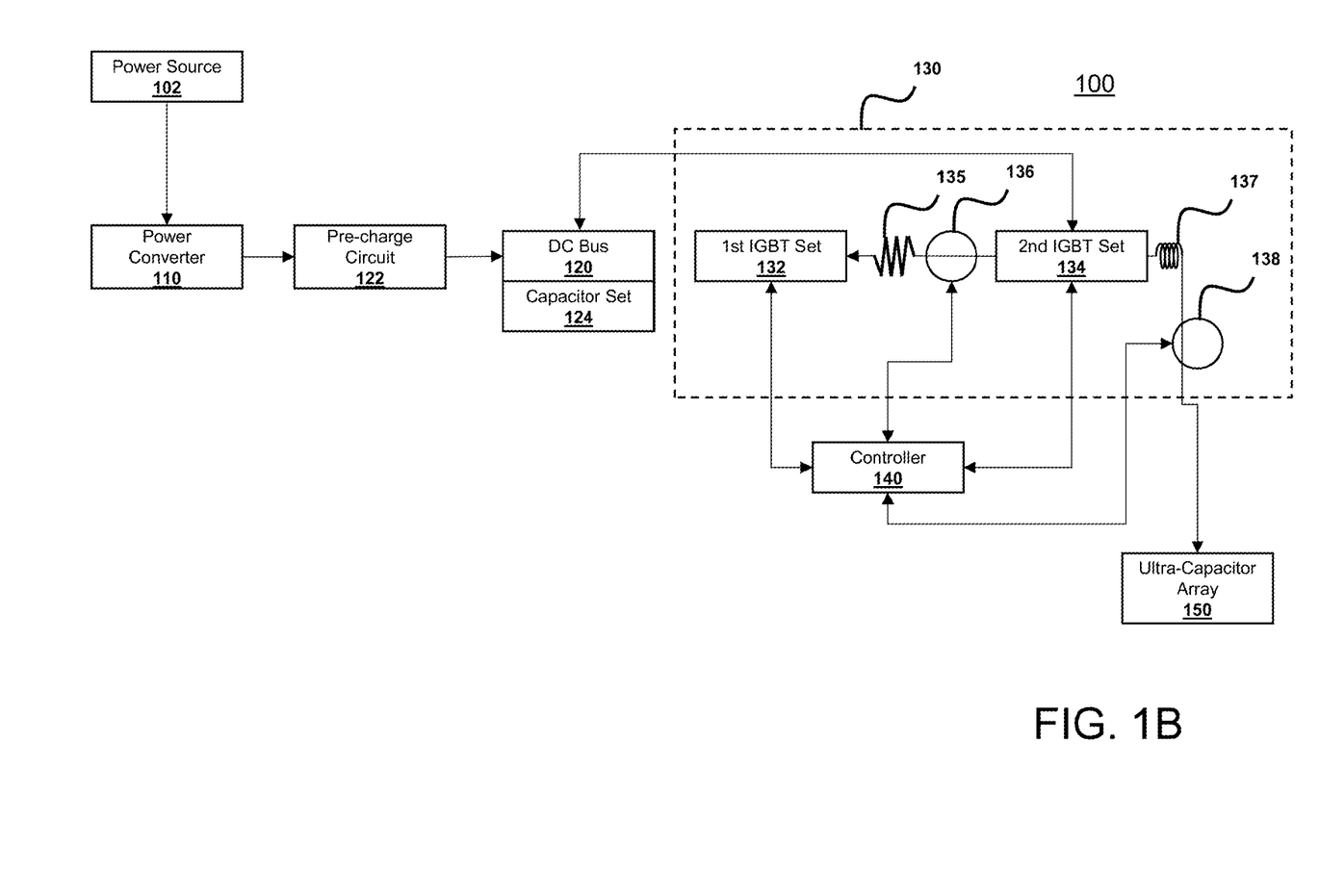

Referring now to FIGS. 1A-1B, FIGS. 1A-1B are diagrams of an exemplary environment 100 in which systems, products, and/or methods, as described herein, may be implemented. As shown in FIGS. 1A-1B, environment 100 may include power source 102, power converter 110, DC bus 120, pre-charge circuit 122, capacitor set 124, IGBTs 130 (e.g., first IGBT set 132, second IGBT set 134, and/or the like), discharge resistor 135, first current sensor 136, reactor 137, second current sensor 138, controller 140, ultra-capacitor array 150, and/or the like.

Power source 102 may include any suitable power source. For example, power source 102 may include a connection to a power grid (e.g., public power grid, municipal power grid, utility power grid, and/or the like). Additionally or alternatively, power source 102 may include at least one of a windmill, a power plant (e.g., coal power plant, natural gas power plant, gasoline power plant, diesel power plant, nuclear power plant, any combination thereof, and/or the like), one or more solar panels (e.g., an array of solar panels), one or more thermoelectric devices, a generator (e.g., diesel generator, gasoline generator, and/or the like), a battery, any combination thereof, and/or the like. In some non-limiting embodiments, power source 102 may include an AC power supply (e.g., single phase AC, three phase AC, and/or the like). Additionally or alternatively, power source 102 may include a DC power supply. In some non-limiting embodiments, power source 102 may be connected (e.g., electrically connected, coupled, and/or the like) to power converter 110 (e.g., directly and/or via at least one of a switch, a fuse, any combination thereof, and/or the like) and/or the like. In some non-limiting embodiments, the potential (e.g., voltage (V)), current (e.g., amperes (A)), and/or power (e.g., watts (W)) of power source 102 may be selected (e.g., predetermined, preselected, dynamically selected, and/or the like) based on the power demands of the system (e.g., ultra-capacitor array 150 and/or the like), based on availability (e.g., power grid in the area of the system and/or the like), and/or the like. For example, power source 102 may have a potential of 120 volts AC (VAC) (e.g., determined based on root mean squared (RMS) voltage and/or the like), 240 VAC, 480 VAC, 690 VAC, and/or the like.

Power converter 110 may include at least one electronic component (e.g. at least one diode and/or the like), at least one circuit, any combination thereof, and/or the like. In some non-limiting embodiments, power converter 110 may be connected (e.g., electrically connected, coupled, and/or the like) to power source 102 (e.g., directly and/or via at least one of a switch, a circuit breaking element, any combination thereof, and/or the like). Additionally or alternatively, power converter 110 may be connected (e.g., electrically connected, coupled, and/or the like) to DC bus 120 (e.g., directly, via pre-charge circuit 122, and/or the like). In some non-limiting embodiments, power converter 110 may be configured to receive power from power source 102. Additionally or alternatively, power converter 110 may be configured to supply power to DC bus 120. In some non-limiting embodiments, power converter 110 may be configured to convert power. For example, if power source 102 is an AC power supply, power converter 110 may convert power from AC to DC. Additionally or alternatively, if power source 102 includes a DC power supply, power converter 110 may be configured to convert power from DC (e.g., at a first potential) to DC (e.g., at a second potential). In some non-limiting embodiments, power converter 110 may be configured to convert power from a first potential (e.g., first voltage) to a second potential (e.g., second voltage). For example, the second potential (e.g., voltage) may be higher than the first potential (e.g., voltage). In some non-limiting embodiments, the second potential may be selected (e.g., predetermined, preselected, dynamically selected, and/or the like) based on the power demands of the system (e.g., DC bus 120, ultra-capacitor array 150, and/or the like) and/or the like. Additionally or alternatively, the second potential may be selected to meet and/or exceed a ratio based on the desired potential of DC bus 120 (e.g., the ratio of the potential of the DC bus 120 in volts DC (VDC) to the second potential in VAC may be less than or equal to 1.414 (e.g., the square root of 2), 1.3, 1.25, 1.231, 1.2, 1.15, 1.143, and/or the like). In some non-limiting embodiments, power converter 110 may include a diode bridge rectifier. For example, the diode bridge rectifier may include at least one diode for each phase of the input power from power source 102. In some non-limiting embodiments, the diode bridge rectifier may include at least two diodes for each phase of input power from power source 102 (e.g., two diodes for each phase of three phase AC input power, resulting in six total diodes).

Pre-charge circuit 122 may include at least one electronic component, at least one circuit, any combination thereof, and/or the like. In some non-limiting embodiments, pre-charge circuit 122 may be connected (e.g., electrically connected, coupled, and/or the like) to power converter 110. Additionally or alternatively, pre-charge circuit 122 may be connected (e.g., electrically connected, coupled, and/or the like) to DC bus 120. In some non-limiting embodiments, pre-charge circuit 122 may include at least one of a contactor, a resistor (e.g., a pre-charge resistor), any combination thereof, and/or the like. For example, pre-charge circuit 122 may include a contactor connected across (e.g., in parallel with and/or the like) a pre-charge resistor.

Capacitor set 124 may include at least one electronic component, at least one circuit, any combination thereof, and/or the like. In some non-limiting embodiments, capacitor set 124 may be connected (e.g., electrically connected, coupled, and/or the like) to power converter 110 (e.g., directly, via pre-charge circuit 122, and/or the like). Additionally or alternatively, capacitor set 124 may be connected (e.g., electrically connected, coupled, and/or the like) to DC bus 120. In some non-limiting embodiments, capacitor set 124 may include at least one capacitor and/or the like. For example, capacitor set 124 may include six capacitors. In some non-limiting embodiments, capacitor set 124 may enable DC bus 120 to remain at a more consistent voltage level (e.g., stiffen the DC bus and/or the like). Additionally or alternatively, capacitor set 124 may reduce parasitic inductance.

DC bus 120 may include any suitable high voltage bus. For example, DC bus 120 may include a busbar, a copper bar, a metallic bar, a conductive bar, a wide and/or thick conductor, any combination thereof, and/or the like. In some non-limiting embodiments, DC bus 120 may have relatively low resistance for DC power. Additionally or alternatively, DC bus 120 may be configured to operate in a range of voltages. For example, DC bus 120 may be configured to operate at voltages of 100-3,000 volts, over 480 volts, over 575 volts, over 650 volts, over 690 volts, over 700 volts, over 750 volts, any combination thereof, and/or the like. In some non-limiting embodiments, DC bus 120 may be connected (e.g., electrically connected, coupled, and/or the like) to power converter 110 (e.g., directly, via pre-charge circuit 122, and/or the like), capacitor set 124, IGBTs 130 (e.g., first IGBT set 132, second IGBT set 134, and/or the like), ultra-capacitor array 150, any combination thereof, and/or the like. In some non-limiting embodiments, the potential of DC bus 120 may be selected (e.g., predetermined, preselected, dynamically selected, and/or the like) based on the power demands of the system (e.g., ultra-capacitor array 150 and/or the like) and/or the like. Additionally or alternatively, the potential of DC bus 120 may be selected to meet and/or exceed a threshold based on the desired potential of ultra-capacitor array 150. For example, the potential of DC bus 120 may be less than or equal to 800 VDC (e.g. a range of 790-800 VDC), less than or equal to 1200 VDC (e.g., a range of 1190-1200 VDC), and/or the like.

IGBTs 130 may include at least one electronic component (e.g., at least one IGBT), at least one circuit, any combination thereof, and/or the like. In some non-limiting embodiments, IGBTs 130 may be connected (e.g., electrically connected, coupled, and/or the like) to DC bus 120. Additionally or alternatively, IGBTs 130 may be connected (e.g., electrically connected, coupled, and/or the like) to ultra-capacitor array 150. Additionally or alternatively, IGBTs 130 may be connected to and/or in communication with controller 140. In some non-limiting embodiments, IGBTs 130 may include at least one IGBT and/or the like. For example, IGBTs 130 may include first IGBT set 132, second IGBT set 134, any combination thereof and/or the like. In some non-limiting embodiments, each of first IGBT set 132 and second IGBT set 134 may include at least one IGBT and/or the like. For example, each of first IGBT set 132 and second IGBT set 134 may include two IGBTs.

In some non-limiting embodiments, first IGBT set 132 may be connected to at least one of discharge resistor 135, first current sensor 136, any combination thereof, and/or the like. For example, first IGBT set 132, discharge resistor 135, and first current sensor 136 may be connected in series (e.g., in that order). Additionally or alternatively, first IGBT set 132 may be connected (e.g., directly, indirectly via discharge resistor 135 and first current sensor 136, and/or the like) to second IGBT set 134. In some non-limiting embodiments, second IGBT set 134 may be connected to at least one of reactor 137 (e.g., at least one inductor and/or the like), second current sensor 138, any combination thereof, and/or the like. For example, second IGBT set 134, reactor 137, and second current sensor 138 may be connected in series (e.g., in that order). Additionally or alternatively, second IGBT set 134 may be connected (e.g., directly, indirectly via reactor 137 and second current sensor 138, and/or the like) to ultra-capacitor array 150. In some non-limiting embodiments, first current sensor 136 and/or second current sensor 138 may be connected to and/or in communication with controller 140.

Controller 140 may include one or more devices capable of receiving information from, communicating information to, and/or controlling IGBTs 130 (e.g., first IGBT set 132, second IGBT set 134, any combination thereof, and/or the like), first current sensor 136, second current sensor 138, any combination thereof, and/or the like. In some non-limiting embodiments, controller 140 may be implemented in hardware, software, firmware, and/or any combination thereof. For example, controller 140 may include a computing device, such as a processor (e.g., a central processing unit (CPU), a graphics processing unit (GPU), an accelerated processing unit (APU), and/or the like), a microprocessor, a digital signal processor (DSP), a processing component (e.g., a field-programmable gate array (FPGA), an application-specific integrated circuit (ASIC), a programmable logic controller (PLC), and/or the like), a group of computing devices, other like devices, any combination thereof, and/or the like, which can be programmed to perform a function. In some non-limiting embodiments, controller 140 may include a cabinet including at least one processing component (e.g., PLC and/or the like), a human-machine interface (HMI), and/or the like. In some non-limiting embodiments, controller 140 may be in communication with a data storage device, which may be local or remote to controller 140. In some non-limiting embodiments, controller 140 may be capable of receiving information from, storing information in, communicating information to, and/or searching information stored in the data storage device. In some non-limiting embodiments, controller 140 may control (e.g., send signals to the electrodes of and/or the like) first IGBT set 132 based on current sensed via first current sensor 136 and/or the like. Additionally or alternatively, controller 140 may control (e.g., send signals to the electrodes of and/or the like) second IGBT set 134 based on current sensed via second current sensor 138 and/or the like.

In some non-limiting embodiments, controller 140 may control (e.g., send signals to the electrodes of and/or the like) first IGBT set 132 based on current sensed via first current sensor 136 to control how much current goes into discharge resistor 135 over time (e.g., to act as a chopper circuit and/or the like). For example, this may reduce the resistance needed at discharge resistor 135 (e.g., to reduce or eliminate a need for a very high amount of resistance for short periods of time). As such, less energy may be wasted, and money and resources can be saved with respect to having a larger amount of resistance.

In some non-limiting embodiments, controller 140 may control (e.g., send signals to the electrodes of and/or the like) second IGBT set 134 based on current sensed via second current sensor 138 to control how much current goes into ultra-capacitor array 150 (e.g., to act as a charger circuit and/or the like). For example, this may maintain the current going into ultra-capacitor array 150 at a desired level, may maintain incoming current near power a factor of 1 (e.g., in a range of 0.985 to 1 and/or the like), may reduce and/or eliminate sudden changes in (e.g., spikes in) current, and/or may prevent current going into ultra-capacitor array 150 from exceeding a threshold. Additionally or alternatively, reactor 137 may help maintain the current going into ultra-capacitor array 150 at a desired level.

Ultra-capacitor array 150 may include a plurality of ultra-capacitors. In some non-limiting embodiments, ultra-capacitor array 150 may be connected (e.g., electrically connected, coupled, and/or the like) to DC bus 120 and/or the like. In some non-limiting embodiments, ultra-capacitor array 150 may include a number of ultra-capacitors selected based on the energy needs (e.g., power demands and/or the like) of the system. Additionally or alternatively, ultra-capacitors (of ultra-capacitor array 150) may be provided in modules (e.g., subsets) corresponding to a fixed unit of energy storage representing a maximum suggested energy storage amount of the ultra-capacitors in the module. In some non-limiting embodiments, at least some ultra-capacitors (and/or modules thereof) may be connected in series, e.g., such that the combined (e.g., summed and/or the like) voltage of the series-connected ultra-capacitors satisfies (e.g., equals, exceeds, and/or the like) the desired operating voltages of DC bus 120 and/or the like. Additionally or alternatively, at least some ultra-capacitors (and/or modules thereof) may be connected in parallel, e.g., such that the combined (e.g., summed and/or the like) current of the parallel-connected ultra-capacitors satisfies (e.g., equals, exceeds, and/or the like) the desired current of the system. In some non-limiting embodiments, the capacitance (e.g., farads (F)) of ultra-capacitor array 150 may be selected (e.g., predetermined, preselected, dynamically selected, and/or the like) based on the power demands of the system (e.g., DC bus 120) and/or the like. Additionally or alternatively, the capacitance (e.g., farads (F)) of ultra-capacitor array 150 may be selected to meet and/or exceed a ratio based on the desired potential, power, and/or the like of DC bus 120. For example, the capacitance of ultra-capacitor array 150 may be 13.88 F, 30 F, 60 F, and/or the like.

The number and arrangement of components, devices, and/or systems shown in FIGS. 1A-1B are provided as an example. There may be additional components, devices, and/or systems; fewer components, devices, and/or systems; different components, devices, and/or systems; and/or differently arranged components, devices, and/or systems than those shown in FIGS. 1A-1B. Furthermore, two or more components, devices, and/or systems shown in FIGS. 1A-1B may be implemented within a single component, device, and/or system, or a single component, device, and/or system shown in FIGS. 1A-1B may be implemented as multiple, distributed components, devices, and/or systems. Additionally or alternatively, a set of components (e.g., one or more components), a set of devices (e.g., one or more devices), and/or a set of systems (e.g., one or more systems) of environment 100 may perform one or more functions described as being performed by another set of components, another set of devices, and/or another set of systems of environment 100.

Figure 2:
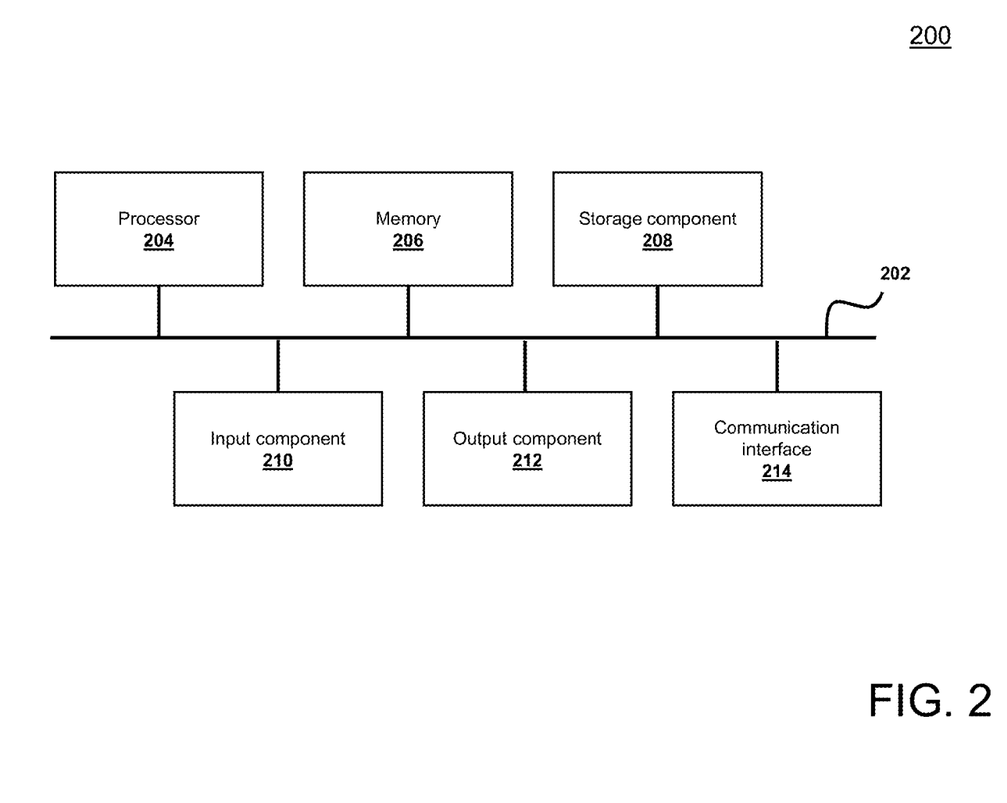
FIG. 2 is a diagram of example components of one or more devices of FIG. 1 according to non-limiting embodiments of the principles of the presently disclosed subject matter.

Referring now to FIG. 2, FIG. 2 is a diagram of example components of an exemplary device 200. Device 200 may correspond to one or more devices of controller 140. In some non-limiting embodiments, controller 140 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, firmware, and/or any combination thereof. For example, processor 204 may include a processor (e.g., a central processing unit (CPU), a graphics processing unit (GPU), an accelerated processing unit (APU), and/or the like), a microprocessor, a digital signal processor (DSP), and/or any processing component (e.g., a field-programmable gate array (FPGA), an application-specific integrated circuit (ASIC), a programmable logic controller (PLC), and/or the like), and/or the like, which can be programmed to perform a function. Memory 206 may include random access memory (RAM), read-only memory (ROM), and/or another type of dynamic or static storage device (e.g., flash memory, magnetic memory, optical memory, and/or the like) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, and/or the like), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, a camera, and/or the like). Additionally or alternatively, input component 210 may include a sensor for sensing information (e.g., a voltmeter, an ammeter, a multimeter, an electric meter, a global positioning system (GPS) component, an accelerometer, a gyroscope, an actuator, and/or the like). Output component 212 may include a component that provides output information from device 200 (e.g., a display, a speaker, one or more light-emitting diodes (LEDs), and/or the like).

Communication interface 214 may include a transceiver-like component (e.g., a transceiver, a receiver and transmitter that are separate, and/or the like) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a Bluetooth® interface, a Zigbee® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A non-transitory memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
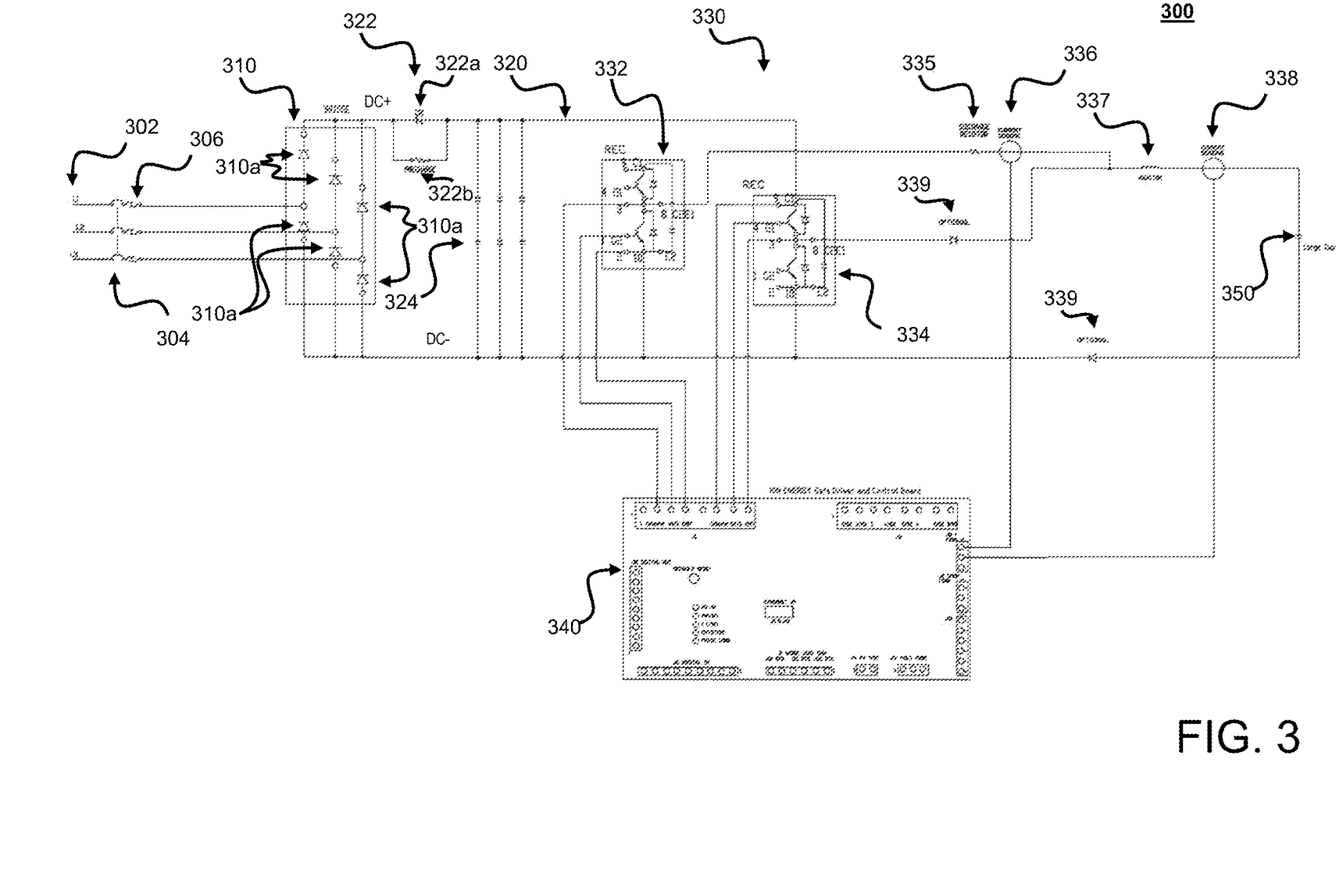
FIG. 3 is a circuit diagram of an exemplary implementation of a system for an insulated-gate bipolar transistor (IGBT) rectifier for charging ultra-capacitors according to non-limiting embodiments of the principles of the presently disclosed subject matter.

Referring now to FIG. 3, FIG. 3 is a circuit diagram of an exemplary implementation 300 of a system for an IGBT rectifier for charging ultra-capacitors. As shown in FIG. 3, implementation 300 may include power source 302, at least one switch 304, at least one circuit breaking element 306, bridge rectifier 310 (e.g., including diodes 310a), DC bus 320, pre-charge circuit 322, pre-charge contactor 322a, pre-charge resistor 322b, capacitor set 324, IGBTs 330 (e.g., first IGBT set 332, second IGBT set 334, and/or the like), discharge resistor 335, first current sensor 336, reactor 337, second current sensor 338, at least one diode 339, controller 340, ultra-capacitor array 350, and/or the like. In some non-limiting embodiments, power source 302 may be the same as or similar to power source 102. In some non-limiting embodiments, bridge rectifier 310 may be the same as or similar to power converter 110. In some non-limiting embodiments, when power source 302 is a DC power source, bridge rectifier 310 may be removed from implementation 300. In some non-limiting embodiments, DC bus 320 may be the same as or similar to DC bus 120. In some non-limiting embodiments, pre-charge circuit 322 may be the same as or similar to pre-charge circuit 122. In some non-limiting embodiments, capacitor set 324 may be the same as or similar to capacitor set 124. In some non-limiting embodiments, IGBTs 330 may be the same as or similar to IGBTs 130. In some non-limiting embodiments, first IGBT set 332 may be the same as or similar to first IGBT set 132. In some non-limiting embodiments, second IGBT set 334 may be the same as or similar to second IGBT set 134. In some non-limiting embodiments, discharge resistor 335 may be the same as or similar to discharge resistor 135. In some non-limiting embodiments, first current sensor 336 may be the same as or similar to first current sensor 136. In some non-limiting embodiments, reactor 337 may be the same as or similar to reactor 137. In some non-limiting embodiments, second current sensor 338 may be the same as or similar to current sensor 138. In some non-limiting embodiments, controller 340 may be the same as or similar to controller 140. In some non-limiting embodiments, ultra-capacitor array 350 may be the same as or similar to ultra-capacitor array 150.

In some non-limiting embodiments, power source 302 may include an AC power supply, as described herein. For example, bridge rectifier 310 may convert AC power from the AC power supply to DC power to be supplied to DC bus 320. In some non-limiting embodiments power source 302 may include a multi-phase AC power supply. For example, the multi-phase AC power supply may include a three-phase AC power supply, which may include a first power line (L1), a second power line (L2), and/or a third power line (L3).

In some non-limiting embodiments, at least one switch 304 may be connected to power source 302. Additionally or alternatively, at least one circuit breaking element 306 may be connected to the switch(es) 304 (e.g., between switch(es) 304 and bridge rectifier 310). In some non-limiting embodiments, each switch 304 may include an electrical switch (e.g., a switch to turn on or off the connection to power source 302). Additionally or alternatively, each circuit breaking element 306 may include at least one circuit breaking element, such as an electrical fuse, circuit breaker, any combination thereof, and/or the like. In some non-limiting embodiments, each switch 304 may be configured to receive power from power source 302 and to supply power to bridge rectifier 310 via the circuit breaking element(s) 306.

In some non-limiting embodiments, pre-charge circuit 322 may include contactor 322a in parallel with resistor 322b. Additionally or alternatively, pre-charge circuit 322 may be connected between bridge rectifier 310 and DC bus 320.

In some non-limiting embodiments, bridge rectifier 310 may be configured to receive power from power source 302 (e.g., via switches 304 and/or circuit breaking elements 306). In some non-limiting embodiments, bridge rectifier 310 may include a diode bridge rectifier. For example, the diode bridge rectifier may include at least one diode 310a for each phase of a multi-phase AC power supply 302. In some non-limiting embodiments, bridge rectifier 310 may include a first diode 310a connected on a first side of the first power line (L1), a second diode 310a on a second side of the first power line (L1), a third diode 310a connected on a first side of the second power line (L2), a fourth diode 310a on a second side of the second power line (L2), a fifth diode 310a connected on a first side of the third power line (L3), and/or a sixth diode 310a on a second side of the third power line (L3).

In some non-limiting embodiments, DC bus 320 may be connected to bridge rectifier 310 (e.g., via pre-charge circuit 322) and configured to receive power from bridge rectifier 310. In some non-limiting embodiments, capacitor set 324 may include a plurality of capacitors connected to DC bus 320. For example, capacitor set 324 may be configured to maintain (e.g., stiffen) a voltage level of the DC bus.

In some non-limiting embodiments, IGBTs 330 may be connected to DC bus 320 and configured to receive power from DC bus 320. For example, IGBTs 330 may include first IGBT set 332 and second IGBT set 334. In some non-limiting embodiments, first IGBT set 332 may be connected to discharge resistor 335, and discharge resistor 335 may be connected to first current sensor 336. Additionally or alternatively, second IGBT set 334 may be connected to reactor 337, and reactor 337 may be connected to second current sensor 338. First current sensor 336 and second current sensor 338 may be connected to controller 340.

In some non-limiting embodiments, second IGBT set 334 may include a first (e.g., top) IGBT and a second (e.g., bottom) IGBT. In some non-limiting embodiments, DC bus 320 may be connected to a collector (C1) of the first IGBT. Additionally or alternatively, reactor 337 may be connected to an emitter (E1) of the first IGBT. (For notation purposes, since the emitter/E1 of the first IGBT is connected to the collector/C2 of the second IGBT, the node may be referred to as C2E1, as shown in FIG. 3.) In some non-limiting embodiments, ultra-capacitor array 350 may be connected to second current sensor 338 opposite reactor 337.

In some non-limiting embodiments, first IGBT set 332 may include a first (e.g., top) IGBT and a second (e.g., bottom) IGBT. In some non-limiting embodiments, first current sensor 336 may be connected between the emitter (C2E1) of the first IGBT of second IGBT set 334 and reactor 337. Additionally or alternatively, a collector (C2E1) of the second IGBT of first IGBTG set 332 may be connected to discharge resistor 335 opposite first current sensor 336. In some non-limiting embodiments, an emitter (E2) of the second IGBT of first IGBT set 332 may be connected to ground.

In some non-limiting embodiments, ultra-capacitor array 350 may be connected to IGBTs 330 (e.g., via reactor 337 and second current sensor 338). In some non-limiting embodiments, controller 340 may control IGBTs 330 to charge the array of ultra-capacitors.

In some non-limiting embodiments, controller 340 may be configured to control first IGBT set 332 based on current sensed by first current sensor 336. For example, controller 340 may be connected to the collector (C2E1), gate (G2), and/or emitter (E2) of the second IGBT of first IGBT set 332. Additionally, controller 340 may switch the IGBT on (e.g., by applying a voltage to the gate/G2) to allow current to flow through discharge resistor 335 and/or switch the IGBT off (e.g., by turning off the voltage or supplying negative voltage to the gate/G2). In some non-limiting embodiments, controller 340 may control first IGBT set 332 based on current sensed by first current sensor 336 to control an amount of current supplied to (e.g., flowing through) discharge resistor 335 over time. (e.g., to act as a chopper circuit and/or the like). For example, this may reduce the resistance needed at discharge resistor 335 (e.g., to reduce or eliminate a need for a very high amount of resistance for short periods of time). As such, less energy may be wasted, and money and resources can be saved with respect to having a larger amount of resistance.

In some non-limiting embodiments, controller 340 may be configured to control second IGBT set 334 based on current sensed by second current sensor 338. For example, controller 340 may be connected to the collector (C1), gate (G1), and/or emitter (C2E1) of the first IGBT of second IGBT set 334. Additionally, controller 340 may switch the IGBT on (e.g., by applying a voltage to the gate/G1) to allow current to flow through reactor 337 and/or switch the IGBT off (e.g., by turning off the voltage or supplying negative voltage to the gate/G1). In some non-limiting embodiments, controller 340 may be configured to control second IGBT set 334 based on current sensed by second current sensor 338 to control an amount of current supplied to ultra-capacitor 350 over time (e.g., to act as a charger circuit and/or the like). For example, this may maintain the current going into ultra-capacitor array 350 at a desired level, may maintain incoming current near power a factor of 1, may reduce and/or eliminate sudden changes in current, and/or may prevent the current going into ultra-capacitor array 350 from exceeding a threshold. Additionally or alternatively, reactor 337 may help maintain the current going into ultra-capacitor array 350 at a desired level.

In some non-limiting embodiments, each diode 339 may be connected as shown, e.g., to protect the other electronic components, circuits, and/or the like by ensuring current only flows in one direction.

Figure 4:
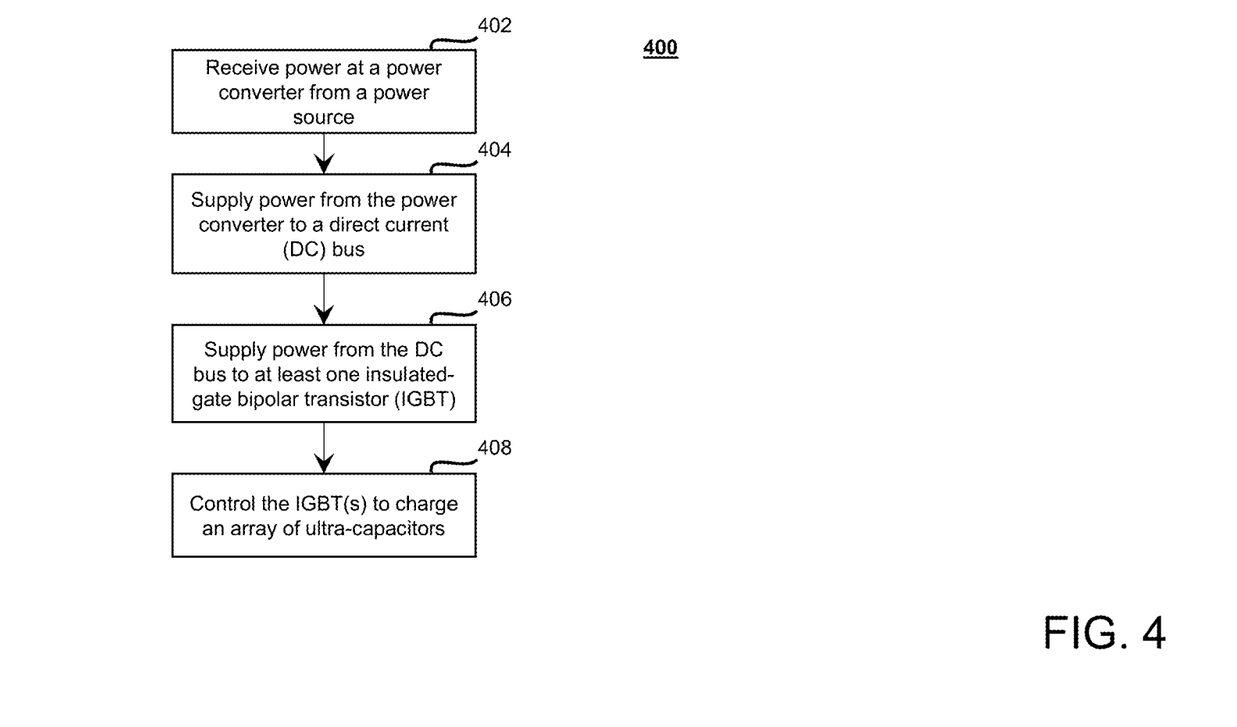
FIG. 4 is a flow diagram of an exemplary process for an IGBT rectifier for charging ultra-capacitors according to non-limiting embodiments of the principles of the presently disclosed subject matter.

Referring now to FIG. 4, shown is a process 400 for an IGBT rectifier for charging ultra-capacitors according to some non-limiting embodiments. The steps shown in FIG. 4 are for example purposes only. It will be appreciated that additional, fewer, different, and/or a different order of steps may be used in non-limiting embodiments.

As shown in FIG. 4, at step 402, process 400 may include receiving power at a power converter from a power source. For example, power converter 110 may receive power from power source 102, as described herein.

In some non-limiting embodiments, bridge rectifier 310 may convert power from AC to DC, as described herein.

As shown in FIG. 4, at step 404, process 400 may include supplying power from the power converter to a DC bus. For example, power converter 110 may supply power to DC bus 120, as described herein.

As shown in FIG. 4, at step 406, process 400 may include supplying power from the DC bus to at least one IGBT. For example, DC bus 120 may supply power to IGBTs 130, as described herein.

In some non-limiting embodiments, IGBTs 130 may include first IGBT set 132 and second IGBT set 134, as described herein. First IGBT set 132 may be connected to discharge resistor 135, and discharge resistor 135 may be connected to first current sensor 136, as described herein. Second IGBT set 134 may be connected to reactor 137, and reactor 137 may be connected to second current sensor 138, as described herein.

As shown in FIG. 4, at step 408, process 400 may include controlling the IGBT(s) to charge an array of ultra-capacitors. For example, controller 140 may control IGBTs 130 to charge ultra-capacitor array 150, as described herein.

In some non-limiting embodiments, controlling IGBTs 130 may include controlling first IGBT set 132 based on current sensed by first current sensor 136 and controlling second IGBT set 134 based on current sensed by second current sensor 138, as described herein. For example, controller 140 may control first IGBT set 132 based on current sensed by first current sensor 136 to control a first amount of current supplied to discharge resistor 135 over time, as described herein. Additionally or alternatively, controller 140 may control second IGBT set 134 based on current sensed by second current sensor 138 to control a second amount of current supplied to ultra-capacitor array 150 over time, as described herein.

Figure 5:
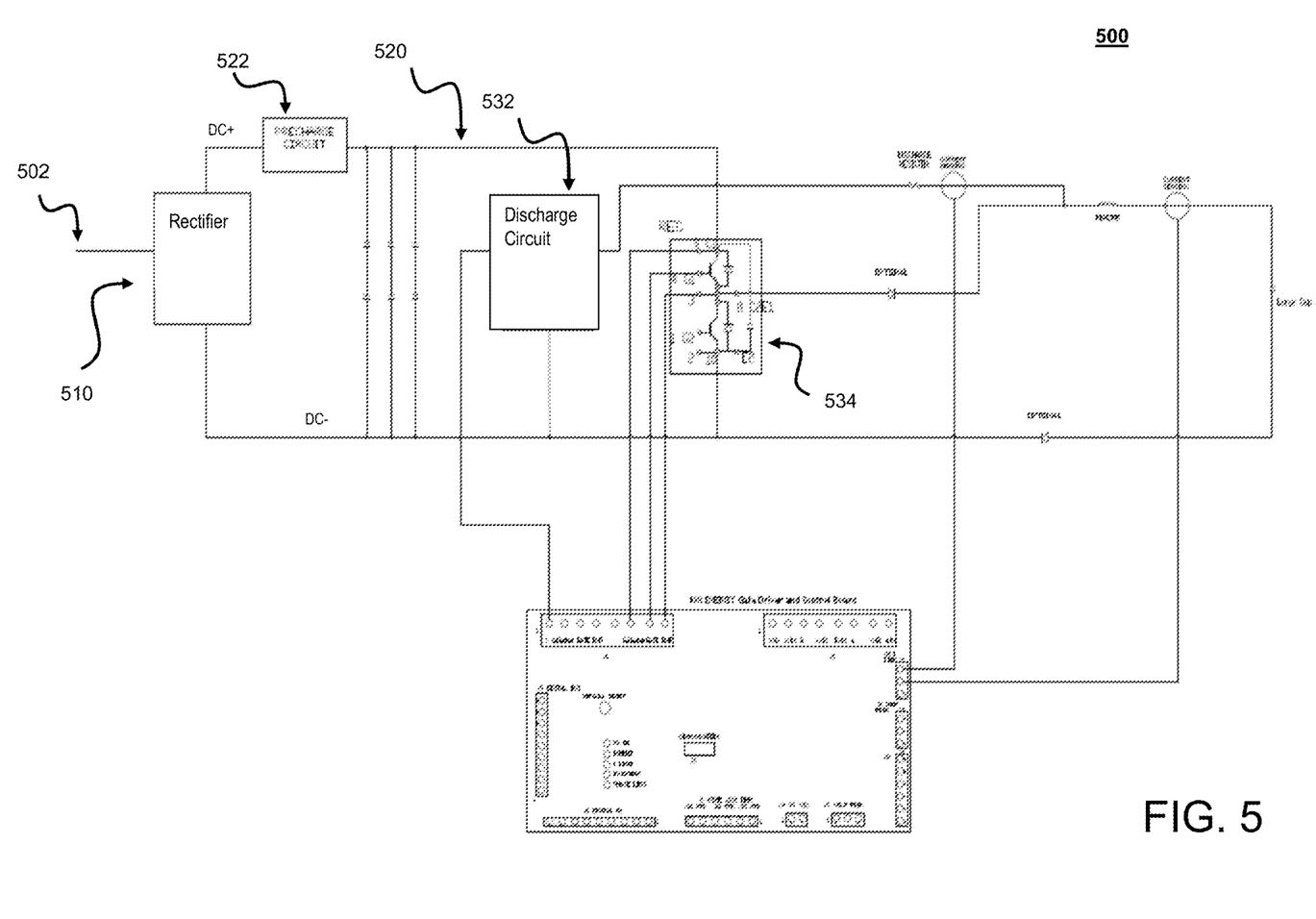
FIG. 5 is a circuit diagram of another exemplary implementation of a system for an insulated-gate bipolar transistor (IGBT) rectifier for charging ultra-capacitors according to non-limiting embodiments of the principles of the presently disclosed subject matter.

Referring now to FIG. 5, FIG. 5 is a circuit diagram of an exemplary implementation 500 of a system for an IGBT rectifier for charging ultra-capacitors. In some non-limiting embodiments, implementation 500 may be the same as or similar to implementation 300. Potential differences between implementation 500 and implementation 300 are described below. As shown in FIG. 5, implementation 500 may include power source 502, rectifier 510, bus 520, pre-charge circuit 522, discharge circuit 532, and IGBT set 534. In some non-limiting embodiments, power source 502 may be the same as or similar to power source 102 and/or power source 302. In some non-limiting embodiments, rectifier 510 may be the same as or similar to power converter 110 and/or bridge rectifier 310. In some non-limiting embodiments, when power source 502 is a DC power source, rectifier 510 may be removed from implementation 500. In some non-limiting embodiments, bus 520 may be the same as or similar to DC bus 320 and/or DC bus 120. In some non-limiting embodiments, pre-charge circuit 522 may be the same as or similar to pre-charge circuit 322 and/or pre-charge circuit 122. In some non-limiting embodiments, discharge circuit 532 may be the same as or similar to first IGBT set 332 and/or first IGBT set 132. In some non-limiting embodiments, IGBT set 534 may be the same as or similar to second IGBT set 334 and/or second IGBT set 134.

In some non-limiting embodiments, rectifier 510 may include one or more devices (e.g., one or more electrical devices, such as one or more electrical circuits having one or more circuit components) that is configured to convert AC to DC. For example, rectifier 510 may include a device that is configured to convert AC received from power source 502 to DC. In some non-limiting embodiments, bus 520 may include a busbar or other appropriate structure (e.g., a conductive circuit component with an appropriate size and configuration) based on maximum amount of current to be carried by bus 520. In some non-limiting embodiments, bus 520 may connect pre-charge circuit 522 and second IGBT set 534. In some non-limiting embodiments, pre-charge circuit 522 may include one or more devices that are configured to limit an amount of in-rush current during a power up procedure (e.g., a power up procedure of the system in implementation 500). In some non-limiting embodiments, discharge circuit 532 may include one or more devices configured to dissipate energy (e.g., energy stored in ultra-capacitor array 350) during a power down procedure (e.g., a power down procedure of the system in implementation 500).

Although the disclosed subject matter has been described in detail for the purpose of illustration based on what is currently considered to be the most practical and preferred embodiments, it is to be understood that such detail is solely for that purpose and that the disclosed subject matter is not limited to the disclosed embodiments, but, on the contrary, is intended to cover modifications and equivalent arrangements that are within the spirit and scope of the appended claims. For example, it is to be understood that the presently disclosed subject matter contemplates that, to the extent possible, one or more features of any embodiment can be combined with one or more features of any other embodiment.

What is claimed is:

1. A system, comprising:
   a power converter configured to receive power from a power source;
   a direct current (DC) bus connected to the power converter and configured to receive power from the power converter;
   at least one insulated-gate bipolar transistor (IGBT) connected to the DC bus and configured to receive power from the DC bus;
   an array of ultra-capacitors connected to the at least one IGBT; and
   at least one controller configured to control the at least one IGBT to charge the array of ultra-capacitors,
   wherein the at least one IGBT comprises a first IGBT set and a second IGBT set, the first IGBT set comprising at least one first IGBT and the second IGBT set comprising at least one second IGBT,
   wherein the first IGBT set is connected to a discharge resistor and the discharge resistor is connected to a first current sensor, the first current sensor configured to sense current through the discharge resistor, wherein the second IGBT set is connected to a reactor and the reactor is connected to a second current sensor, wherein the first current sensor is connected between an emitter of a second IGBT of the at least one second IGBT and the reactor, wherein a collector of a first IGBT of the at least one first IGBT is connected to the discharge resistor opposite to the first current sensor, and wherein the first current sensor and the second current sensor are connected to the at least one controller.

2. The system of claim 1, further comprising:

at least one switch connected to the power source; and at least one circuit breaking element connected to the at least one switch and the power converter, wherein the at least one switch is configured to receive power from the power source and to supply power to the power converter via the at least one circuit breaking element.

3. The system of claim 1, wherein the power source comprises an AC power supply, and wherein the power converter is configured to convert an AC power from the AC power supply to a DC power to be supplied to the DC bus.

4. The system of claim 3, wherein the power source comprises a multi-phase AC power supply, wherein the power converter comprises a diode bridge rectifier, and wherein the diode bridge rectifier comprises at least one diode for each phase of the multi-phase AC power supply.

5. The system of claim 4, wherein the multi-phase AC power supply comprises a three-phase AC power supply comprising a first power line, a second power line, and a third power line, and wherein the diode bridge rectifier comprises a first diode connected on a first side of the first power line, a second diode on a second side of the first power line, a third diode connected on a first side of the second power line, a fourth diode on a second side of the second power line, a fifth diode connected on a first side of the third power line, and a sixth diode on a second side of the third power line.

6. The system of claim 1, further comprising a pre-charge circuit comprising a contactor in parallel with a resistor, wherein the pre-charge circuit is connected between the power converter and the DC bus.

7. The system of claim 1, further comprising a capacitor set comprising a plurality of capacitors connected to the DC bus, wherein the capacitor set is configured to maintain a voltage level of the DC bus.

8. The system of claim 1, wherein the at least one controller is configured to control the first IGBT set based on current sensed by the first current sensor, and wherein the at least one controller is configured to control the second IGBT set based on current sensed by the second current sensor.

9. The system of claim 8, wherein the at least one controller is configured to control the first IGBT set based on current sensed by the first current sensor to control an amount of current supplied to the discharge resistor over time.

10. The system of claim 8, wherein the at least one controller is configured to control the second IGBT set based on current sensed by the second current sensor to control an amount of current supplied to the array of ultra-capacitors over time.

11. The system of claim 1, wherein the at least one second IGBT comprises a first-second IGBT and a second-second IGBT, wherein the second IGBT of the at least one second IGBT comprises the first-second IGBT, wherein the DC bus is connected to a collector of the first-second IGBT and wherein the reactor is connected to an emitter of the first-second IGBT, and wherein the array of ultra-capacitors is connected to the second current sensor opposite to the reactor.

12. The system of claim 11, wherein the at least one first IGBT comprises a first-first IGBT and a second-first IGBT, and wherein the first IGBT of the at least one first IGBT comprises the second-first IGBT, and wherein an emitter of the second-first IGBT is connected to ground.

13. A method, comprising:

receiving power at a power converter from a power source;

supplying power from the power converter to a direct current (DC) bus;

supplying power from the DC bus to at least one insulated-gate bipolar transistor (IGBT); and controlling the at least one IGBT to charge an array of ultra-capacitors, wherein the at least one IGBT comprises a first IGBT set and a second IGBT set, wherein the first IGBT set is connected to a discharge resistor and the discharge resistor is connected to a first current sensor configured to sense current through the discharge resistor, wherein the second IGBT set is connected to a reactor and the reactor is connected to a second current sensor, wherein the first current sensor is connected between an emitter of a second IGBT of the at least one second IGBT and the reactor, wherein a collector of a first IGBT of the at least one first IGBT is connected to the discharge resistor opposite to the first current sensor, and wherein controlling the at least one IGBT comprises controlling the first IGBT set based on current sensed by the first current sensor and controlling the second IGBT set based on current sensed by the second current sensor.

14. The method of claim 13, further comprising converting, by the power converter, power from an alternating current (AC) to a DC before supplying power from the power converter to the DC bus.

15. The method of claim 13, wherein controlling the first IGBT set comprises controlling the first IGBT set based on current sensed by the first current sensor to control a first amount of current supplied to the discharge resistor over time, and wherein controlling the second IGBT set comprises controlling the second IGBT set based on current sensed by the second current sensor to control a second amount of current supplied to the array of ultra-capacitors over time.

16. A computer program product comprising at least one non-transitory computer-readable medium including one or more instructions that, when executed by at least one processor, cause the at least one processor to:

control at least one insulated-gate bipolar transistor (IGBT) to receive power from a power source via a power converter and a direct current (DC) bus and to charge an array of ultra-capacitors, wherein the at least one IGBT comprises a first IGBT set and a second IGBT set, wherein the first IGBT set is connected to a discharge resistor and the discharge resistor is connected to a first current sensor configured to sense current through the discharge resistor, wherein the second IGBT set is connected to a reactor and the reactor is connected to a second current sensor, wherein the first current sensor is connected between an emitter of a second IGBT of the at least one second IGBT and the reactor, wherein a collector of a first IGBT of the at least one first IGBT is connected to the discharge resistor opposite to the first current sensor, and wherein controlling the at least one IGBT comprises:

controlling the first IGBT set based on current sensed by the first current sensor to control a first amount of current supplied to the discharge resistor over time, and controlling the second IGBT set based on current sensed by the second current sensor to control a second amount of current supplied to the array of ultra-capacitors over time.

\* \* \* \* \*